(12) United States Patent
Mesrsmid et al.

(10) Patent No.: US 12,399,975 B2
(45) Date of Patent: Aug. 26, 2025

(54) SYNTHETIC BIOMETRICS FOR USER PRIVACY

(71) Applicant: Avast Software s.r.o., Prague (CZ)

(72) Inventors: Martin Mesrsmid, Prague (CZ); Armin Wasicek, Moraga, CA (US)

(73) Assignee: Avast Software s.r.o., Prague (CZ)

( * ) Notice: Subject to any disclaimer, the term of this patent is extended or adjusted under 35 U.S.C. 154(b) by 386 days.

(21) Appl. No.: 17/651,971

(22) Filed: Feb. 22, 2022

(65) Prior Publication Data

US 2023/0267192 A1 Aug. 24, 2023

(51) Int. Cl.
H04L 9/40 (2022.01)
G06F 21/45 (2013.01)

(52) U.S. Cl.
CPC .......... *G06F 21/45* (2013.01); *H04L 63/0861* (2013.01); *G06F 2221/2115* (2013.01)

(58) Field of Classification Search
CPC ............... H04L 63/0861; G06F 21/45; G06F 2221/2115; G06F 21/316; G06F 21/32
USPC .......................................................... 726/6
See application file for complete search history.

(56) References Cited

U.S. PATENT DOCUMENTS

| | | | |
|---|---|---|---|
| 8,806,610 B2 * | 8/2014 | Draluk | G06F 21/32 726/16 |
| 2013/0072295 A1 * | 3/2013 | Alderucci | G07F 17/3237 463/29 |
| 2016/0048670 A1 * | 2/2016 | Kim | G06V 40/1353 382/125 |
| 2018/0261227 A1 * | 9/2018 | Blouet | G10L 17/08 |
| 2020/0128007 A1 | 4/2020 | Connell, II et al. | |

FOREIGN PATENT DOCUMENTS

WO 2016025227 A1 2/2016

OTHER PUBLICATIONS

Securtiy Vulnerabilities Against Fingerprint Biometric System, Joshi et al, May 2018 (Year: 2018).*
Punithavathi P. et al: "Partial DCT-based cancelable biometric authentication with security and privacy preservation for IoT applications", Multimedia Tools and Applications, Kluwer Academic Publishers, Boston, US, vol. 78, No. 18, May 27, 2019 (May 27, 2019), pp. 25487-25514, XP036873613, ISSN: 1380-7501, DOI: 10.1007/SII042-019-7617-1.

(Continued)

*Primary Examiner* — Jahangir Kabir
(74) *Attorney, Agent, or Firm* — AVEK IP, LLC; Mark C. Young

(57) ABSTRACT

A synthetic biometric signature is generated for a user for each of a plurality of third parties, and the synthetic biometric signatures are used to interact with the respective third parties such that each of the third parties sees a different synthetic biometric signature for the user. The synthetic biometric signatures comprise a user's actual biometric data altered by a change vector, an artificial biometric signature, and/or artificial biometric characteristics, or by other artificial components. The synthetic biometric signature can be changed if the synthetic biometric signature is compromised, or the user wishes to reset their user relationship with a particular third-party.

27 Claims, 4 Drawing Sheets

(56) References Cited

OTHER PUBLICATIONS

Yanushkevich S N et al: "Developmental Tools—Synthetic Biometrics", IEEE Computational Intelligence Magazine, IEEE, US, vol. 2, No. 2, May 1, 2007 (May 1, 2007), pp. 60-69, XP011201375, ISSN: 1556-603X.
N.K. Ratha, et al. Enhancing Security and Privacy in Biometrics-based Authentication Systems. IBM Systems Journal, vol. 40, No. 3, 2001. pp. 614-634. Accessed at: https://www.researchgate.net/profile/Jonathan-Connell/publication/220353130_Enhancing_Security_and_Privacy_in_Biometrics-Based_Authentication_Systems/links/555a010508ae6fd2d8281b10/Enhancing-Security-and-Privacy-in-Biometrics-Based-Authentication-Systems.pdf.
Denis Migdal, et al. Keystroke Dynamics Anonymization System. SeCrypt International Conference on Security and Cryptography, Jul. 2019, Prague, Czech Republic. ffhal-02126985 Accessed at: https://hal.archives-ouvertes.fr/hal-02126985/file/2019-cw.pdf.
K. S. Killourhy, et al. Comparing Anomaly-detection Algorithms for Keystroke Dynamics, 2009 IEEE/IFIP International Conference on Dependable Systems & Networks, 2009, pp. 125-134, doi: 10.1109/DSN.2009.5270346. Accessed at: http://www.cs.cmu.edu/afs/cs/Web/People/maxion/pubs/KillourhyMaxion09.pdf.
Google Chrome Web Store, Chrome extension: KeyboardPrivacy Chrome extension. https://chrome.google.com/webstore/detail/keyboard-privacy/aoeboeflhhnobfjkafamelopfeojdohk?hl=en.
Murgan, Tudor A., European Search Report, Jul. 3, 2023, pp. 1-10, European Patent Office, Munich, Germany.

* cited by examiner

SYNTHETIC BIOMETRICS FOR USER PRIVACY

FIELD

The invention relates generally to biometric user identification, and more specifically to synthetic biometrics for user privacy.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet. Still other computer applications rely on identification of parties to a transaction, such as when conducting online commerce or banking, even in the absence of any potential bad actors.

For these and other reasons, many computer systems employ a variety of safeguards designed to protect computer systems against certain threats and to help identify users. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing passwords or other information from a computer or using the computer for unintended purposes. Similarly, web site scanning tools are used to verify the security and integrity of a website, and to identify and fix potential vulnerabilities.

Passwords are particularly valuable to many hackers, as they can provide access to banking accounts, online shopping, and other online services that can be converted to monetary value relatively quickly. Password breaches are frequent problems among website providers, and many "best practices" such as only storing encrypted versions of passwords on servers, using different passwords for each site, and using complex passwords that are long and involve a combination of numbers and letters are often suggested or required. But use of long, complex, and unique passwords for many different web services makes it difficult to remember each password, and almost necessitates storing the passwords someplace that may itself be vulnerable. For reasons such as these, many computerized devices and services employ additional or alternate user authentication methods, such as requiring something a user knows (such as a password), something a user has (such as a USB key), or something a user is (such as biometric identification) to provide identity confirmation.

Biometric identification is commonly used in smart phones, such as by using a fingerprint reader to sense a user's fingerprint or a camera, LIDAR, or similar technology to detect the details of a user's face to unlock the device or log on to a network service or site. Similarly, personal computers and websites often use more indirect biometric measurements such as a person's movement in handling a mouse, typing on a keyboard, handling a device, making gestures, etc., to identify and verify a user's identity. By using physical attributes like fingerprints, iris images, or face scans, or behavioral characteristics such as a user's interaction with a keyboard, mouse, or other part of the device, a computerized system can recognize a user and provide access based on the user's biometric identity.

But, because multiple computerized devices, websites, apps, and the like may rely on biometric identification to authenticate a user's identity, this biometric information can be collected by a provider with ill intent or can be stolen from an honest provider, and used to access any number of other devices, sites, or apps. Similarly, advertisers, social media sites, and other online providers often use behavioral biometrics to identify a user and log their activities to create a profile of the user's interests, impacting the ability of a user to remain anonymous when browsing online.

For reasons such as these, improved handling and protection of user biometric data in computerized systems is desired.

SUMMARY

One example embodiment comprises a method of using synthetic biometrics to authenticate, identify, or verify a user. A plurality of third parties are identified for whom identity protection is desired, and a synthetic biometric signature is generated for the user for each of the plurality of third parties. The user interacts with the associated third parties using a synthetic biometric signature for each of the respective third parties, with the synthetic biometric signature injected in place of the user's actual biometric signature, preventing the third parties from tracking the user across third-party applications or services using the user's actual biometrics.

The synthetic biometric signatures may comprise altered user biometric signatures or synthetic biological characteristics (i.e., a synthetic biometric signal or "deep fake"). The synthetic biometric signatures can be changed as necessary or desired, such as if the synthetic biometric signature is compromised or the user wishes to reset their user relationship with a particular third-party.

The details of one or more examples are set forth in the accompanying drawings and the description below. Other features and advantages will be apparent from the description and drawings, and from the claims.

DETAILED DESCRIPTION

Figure 1:
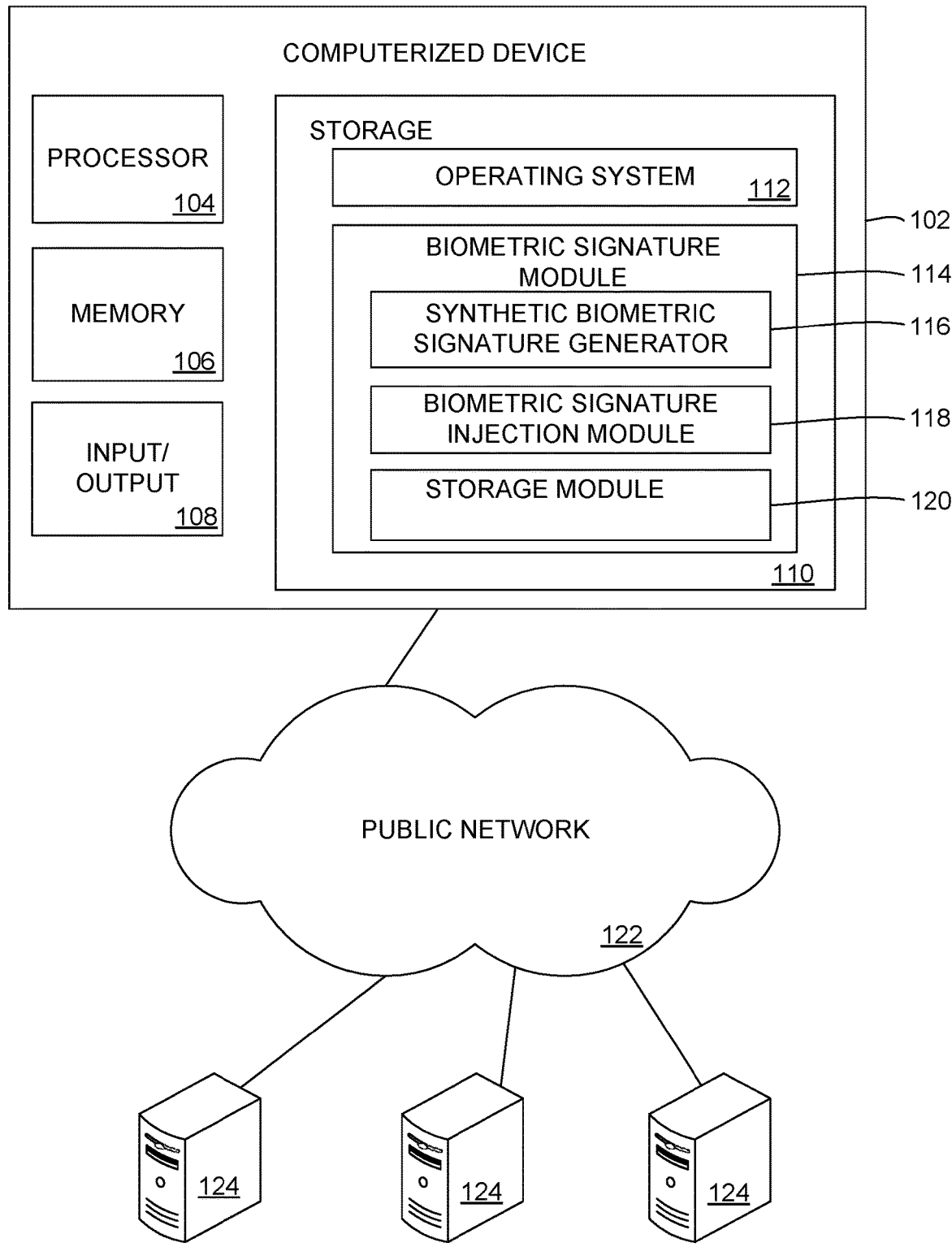
FIG. 1 is a block diagram of a computerized device employing synthetic biometric signatures, consistent with an example embodiment.

In the following detailed description of example embodiments, reference is made to specific example embodiments by way of drawings and illustrations. These examples are described in sufficient detail to enable those skilled in the art to practice what is described and serve to illustrate how elements of these examples may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common files are all frequently infected with malware of various types, and users rely on tools such as antivirus software or other malware protection tools to protect their computerized devices from harm.

In a typical home computer or corporate environment, firewalls inspect and restrict the types of communication that can occur between local devices such as computers or IoT devices and the Internet, antivirus programs prevent known malicious files from being loaded or executed on a computer system, and malware detection programs detect known malicious code such as remailers, keystroke loggers, and other software that is designed to perform undesired operations such as stealing passwords and other information from a computer or using the computer for unintended purposes. Because passwords are particularly valuable and prone to being stolen by hackers, additional user authentication methods such as biometric identification are often used to confirm the identity of a user. Biometric identification is particularly attractive to many users because it does not require the user to keep something as is the case with physical tokens such as SecurID, and does not require the user to remember something such as a password or PIN (Personal Identification Number).

But, biometric identification is often also used in ways that a user may find undesirable, such as to authenticate, identify, or verify a user and build a user profile around that user to target advertising or other recommendations, or used by criminals to assume the identity of the targeted user. For reasons such as these, a user may wish to keep their biometric identity secret from a particular app or service, while still taking advantage of the benefits of being able to use the app or online service. Further, various problems exist with biometric identification such as a user not being able to reset or change their biological characteristics. For example, if a user's fingerprint, iris image, face image, or the like is obtained and copied by a hacker, the user cannot change to different biometric characteristics to avoid future problems with the compromised biometric data. Further, attackers can hack a vendor or pose as a vendor that collects such biometric information, can steal copies of the data from the user's device when the user authenticates themselves with their biometric information, or can indirectly copy the biometric data such as with a face image, fingerprint, or other characteristic revealed through the user's other activities.

Some examples presented herein therefore provide for synthetic biometric signatures that in various examples are different for different third parties, websites, devices, apps, and the like, and that can be reset or changed if a user wishes to reset their identity relationship with a provider or third-party if their identity is compromised. Synthetic biometric signatures include in various examples biometric signatures that include at least some artificial biometric component or part that is synthesized from something other than the user's actual biometrics, such as synthetic biometric signature resulting from a change vector applied to a user's actual biometrics or an entirely artificial or machine-made biometric. In a more detailed example, a synthetic biometric signature is created for each of two or more different third parties, such that each synthetic biometric signature comprises either a modification that is applied to the user's actual biometric signature or a machine-created artificial biometric signature. The synthetic biometric signatures thus may comprise altered user biometric signatures or synthetic biological characteristics (i.e., a synthetic biometric signal or "deep fake").

The synthetic biometric signatures associated with each third-party may then be used to interact with the respective third-party, and can prevent tracking and exposure of a user or exposure of a user's biometrics across different third parties. In order to protect the integrity of the synthetic biometric signatures, the synthetic biometric signatures themselves are preferably not stored on any user device, just as a user's actual biometric signature would typically not be stored. However, components used to generate the synthetic biometric signatures may be stored so that the synthetic biometric signature can be recreated the next time the user wants to access the respective third-party. For example, artificial biometric modifications or change vectors that are applied to a user's actual biometrics in some examples to generate the synthetic biometric signature may be stored, or one or more data items representing or otherwise identifying those components, such as letters, numbers, characters, hashes, and the like may be stored and may be distributed between a user's devices, so that a user's interaction with a particular third-party across different times or devices can generate the same synthetic biometric signature until or unless the user elects to change the biometric signature for that third-party.

FIG. 1 is a block diagram of a computerized device employing synthetic biometric signatures, consistent with an example embodiment. Here, the computerized device 102 includes a processor 104 operable to execute computer program instructions and a memory 106 operable to store information such as program instructions and other data while computerized device 102 is operating. The computerized device exchanges electronic data, takes photographs, receives touch input from a user, and performs other such input/output operations with input/output 108.

Storage 110 stores program instructions including an operating system 112 that provides an interface between software or programs available for execution and the hardware of the computerized device and manages other functions such as access to input/output devices. The storage 110 also stores program instructions and other data for a biometric signature module 114, including a synthetic biometric signature generator 116 that accepts input of a user's real biometric data—i.e., their actual biometrics—and generates a synthetic biometric signature by merging the user's actual biometrics with an artificial component or artificial portion (namely, an artificial biometric signature or artificial biometric characteristics), or, depending on the type of biometric parameter (e.g., face, keyboard typing dynamics, fingerprint, etc.) applying a change vector to the user's actual biometric to generate a synthetic biometric signature, a biometric signature injection module 118, and a storage module 120. In this example, the computerized device is also coupled via a public network 122 to one or more remote computers 124, such as remote web or other servers, servers configured for storage, or remote computers providing other such functions.

In operation, the computerized device provides a biometric signature application that may be executed on the device to generate and use synthetic biometric signatures, such as when interacting with third parties such as servers 124. The biometric signature module in a more detailed example detects interaction with a new third-party, such as a remote Internet server 124, and creates a synthetic biometric signature for use with the third-party via synthetic biometric signature generator 116. The synthetic biometric signature generator in some examples uses an artificial component, such as an artificial biometric signature or a change vector that is applied to a user's actual biometric signature to produce the synthetic biometric signature that is then sent to a third-party, or can generate entirely synthetic biological characteristics ("deep fake) that are sent to the third parties.

The new synthetic biometric signature associated with the third-party is used to authorize access to the third-party, i.e., the synthetic biometric signature is transmitted to the third-party where it is used to authorize access, with the third-party preferably being unaware and/or unable to detect that the received biometric signature is in fact a generated synthetic biometric signature. The artificial component, change vector, one or more data items representing the artificial component or change vector—such as a number, a letter, a character, a hash, or combinations thereof—are stored using storage module. The stored data items, artificial component, or change vectors may be retrieved from storage module 120 for combination with a user's actual biometrics to generate the same synthetic biometric signature for subsequent access to the same third-party. Thus, the user's actual biometrics are never transmitted to the third-party, nor are they stored on a user's device. Similarly, the synthetic biometric signature is not stored on a user's device, rather it is generated as needed by altering or distorting a user's real-time actual biometrics using an artificial component or change vector. Thus, the user's actual identity and actual biometrics are masked from the third parties. In a further example, biometric signature injection module 118, modifies, alters or, in some cases, replaces a user's actual biometric signature captured by a biometric input component of the computerized device 102 such as via input/output devices 108 using an artificial component or a change vector associated with a particular third-party as just described. Once the user's actual biometrics have been modified by the artificial biometric signature or change vector, or has been replaced with an entirely artificial biometric signature, the synthetic biometric signature is sent to the third-party server 124.

The user's actual biological biometric characteristics in some embodiments comprise a unique feature of a person's body, such as a fingerprint, an iris image, an image or three-dimensional scan of their face, or the like. In other examples, the user's biological biometric characteristics comprise a unique behavior exhibited by the person, such as the user's cadence or timing when typing various keys, mouse or other input movements, gestures made by the user, the user's physical handling or movement (such as walking) with the device, and the like. Neither type of biometric characteristic can typically be changed by the user, and behavioral biometrics in particular are often captured without the user's knowledge or notification to the user.

Biometric signatures in some examples comprise actual biometric characteristics as they may be captured by an electronic input device (microphone, camera, fingerprint scanner, iris scanner, mouse, touch screen, accelerometers, location sensors etc.) and/or as subsequently processed by biometric processing algorithms that typically extract most important physical or behavioral features of the biological characteristics specifically designed to provide similar results for the same person when re-taking the scan. Biometric signature capture and processing systems are also typically designed to minimize the probability of false positives and false negatives, while allowing for natural changes in users physical or behavioral features (e.g. aging, facial hair, glasses etc.). Different processing algorithms therefore typically provide different and non-matching biometric signatures, and different input devices (e.g. different types of fingerprint scanners) may result in different biometric signatures, such that biometric signature is dependent on the specific capture technology and processing technology and therefore is not inherent to the individual. For example, two different cameras may capture different images of a face of the same individual and two different processing algorithms may extract different features from those images, resulting in two different biometric signatures for the same individual.

The synthetic biometric signature in some examples comprises a signature that is partially or entirely artificially generated in the synthetic biometric signature generator 116, such as by using a range of known probable or possible human characteristics to generate or synthesize the biometric signature. In another example well-suited for unique body feature synthetic biometric signatures, artificial intelligence methods such as adversarial networks are used to generate the signature. In some examples, the synthetic biometric signature is based at least in part on the user's actual biometric signature but is modified using an artificial biometric signature or a change vector, which are preferably stored or otherwise referenced in storage module 120 and used with the user's actual biometric input to create the synthetic biometric signature. This method has the advantage of still requiring the user's actual biometric input to generate the synthetic biometric signature, as it is derived from both the user's actual biometric input and the change vector, providing a degree of security for the stored change vector. It also passes various "liveness" checks for processing biometric signatures, such as observing mouse or keyboard behavior, device or image movement, etc. Change vector biometric signatures in some examples include both changes to the user's actual biometrics as well as weightings of the changes to be applied to actual measured user biometrics.

In another example, the synthetic biometric signature is modified using a change vector associated with a password (or Personal Identification Number or the like) such that the synthetic biometric signature can only be used with the user's actual biometric signature and the password. Synthetic biometric signatures in some examples are further created as digital representations of artificial biometrics as if captured by an electronic input device such as camera, fingerprint reader, or the like, such that the digital representation of the artificial biometric signature is stored rather than a representation of the user's actual physical biometric traits. In other cases, the synthetic biometric signatures may comprise synthetic biological characteristics (i.e., a synthetic biometric signal or "deep fake").

Once s synthetic biometric signature has been created, the artificial biometric component and/or change vector used to generate that synthetic biometric signature are stored in storage module 120 on the user's computerized device so that the same synthetic biometric signature can be subsequently generated by retrieving the artificial component or change vector and combining with the user's actual biometric data. In some cases, the synthetic biometric signatures may comprise synthetic biological characteristics (i.e., a synthetic biometric signal or "deep fake"). Preferably, a user will have distinct artificial components or change vectors for each third-party that the user wants to authorize access with. Thus, the generated synthetic biometric signatures for each third-party will be unique so that a synthetic biometric signature sent to a first third-party cannot be intercepted and used to authorize access to any other third-party.

Furthermore, because the synthetic biometric signature for each third-party is unique, a user may cancel, delete, or change the signature associated with a particular third-party without affecting the signatures associated with other third parties. For example, if a user suspects that the synthetic biometric signature sent to a third-party has been intercepted or compromised, then the user may simply cancel his or her account with that third-party and reestablish an account and generate a new synthetic biometric signature by using a new or different artificial component or change vector. Thus, the user's access to other third parties has not been compromised and his or her actual biometric data has not been exposed or compromised. Similarly, if a user is banned or denied access to a third-party site, the user can establish new credentials and generate a new synthetic biometric signature for use with that site by simply changing the artificial component or change vector to be used in generating a synthetic biometric signature for use with that site.

In a further example, the artificial component, change vector, or data items are synchronized across different devices the user owns, such as by use of public network 122 to allow the various biometric signature modules 114 across devices 102 to generate the desired synthetic biometric signatures. In another example, a remote server 124 stores artificial components, change vectors, and data items for the user, such that the user's biometric signature module 114 can retrieve those parameters from any device once the user has properly authenticated to the remote server If an attacker gains access to a user's real biometric data, the user's actual biometric signature is permanently compromised and cannot be reset or changed as is the case with passwords and other user authentication methods. Biometric data can be stolen by attackers hacking a third-party server 124 or other vendor or service, by capturing the data on the user's computerized device 102 such as with illicit or malicious software, or by capturing user device 102 communication with other devices such as via public network 122. For example, a smartphone game app may capture user inputs and interaction to create an actual biometric signature of the user that can later be used to gain access to the user's accounts with third-party servers 124 without the user's permission or consent, creating a privacy and security risk for the user of computerized device 102.

Use of a synthetic biometric signature as in this example addresses this concern by providing a user-changeable biometric signature comprising at least partially artificial biometrics to a third-party provider, such that if a user wishes to reset their user relationship with the third-party provider a new synthetic biometric signature associated with that provider can be created and used. Further, by presenting a different synthetic biometric signature to different third-party providers, tracking the user across third-party providers using biometric signatures becomes much more difficult.

Figure 2:
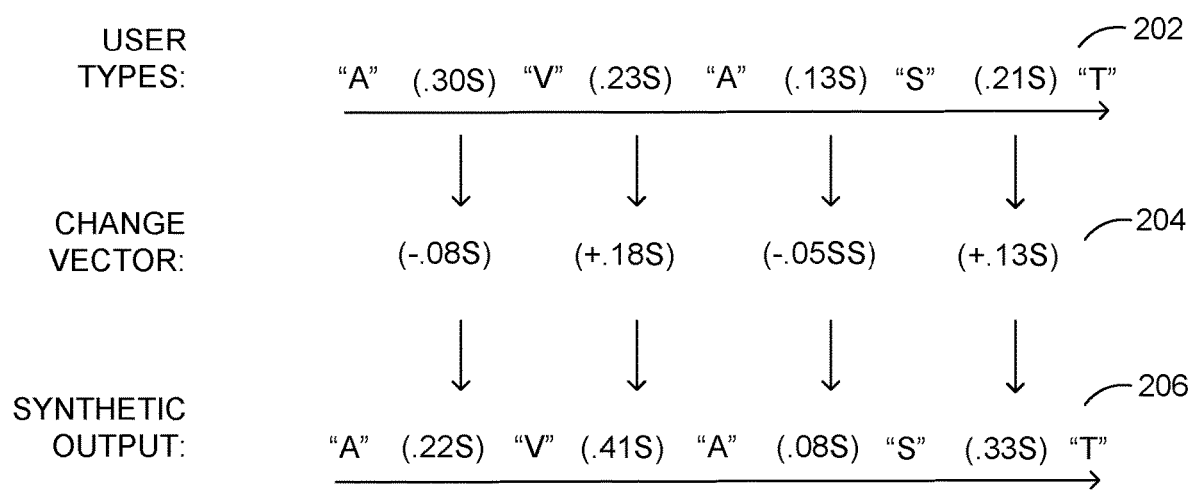
FIG. 2 shows a change vector synthetic biometric signature, consistent with an example embodiment.

FIG. 2 shows a change vector synthetic biometric signature, consistent with an example embodiment. Here, a user types the computer security company brand name "Avast" into a keyboard, such as a virtual keyboard displayed on a smartphone device or a keyboard on a personal computer or tablet. The data entry in this example is keyed into a text entry field in a web page, but in other examples is keyed into an app, or another such product or service that enables a third-party to monitor entry of the text. Here, the entry of each letter is shown at 202, along with the amount of time in seconds between entry of each letter of the word "Avast."

Because different people type different patterns with differing timing based on factors such as physical characteristics of their hands and forearms and muscle memory, the time between keying different pairs of letters differs in different ways for different people. In this example, the user takes from 0.13 seconds to 0.3 seconds to enter the next key, moving significantly more slowly between "A" and "V" (0.30 seconds) than from "A" to "S" (0.13 seconds). If this pattern is repeated across multiple instances of entering these letter pairs, it can be used as part of a biometric signature that can be used to authenticate, identify, or verify the user doing the typing.

At 204, a change vector is applied to the keyed input, comprising changes to each of the sequential letter pair keystroke timings. For example, the time between typing an "A" and a "V" of 0.30 seconds is modified by subtracting 0.08 seconds by applying the change vector to the user's keyed input, resulting in an apparent time of 0.22 seconds between typing "A" and "V" as observed by the remote server 124 providing the web page's text input field. Because the actual physical biometric data of the time between striking different key pairs for the user as shown at 204 is modified using a change vector 204, the resulting synthetic output of an apparent time between keyed entries as shown at 206 reflects a synthetic biometric signature embodied by the change vector shown at 204 rather than the user's actual biometric traits.

In the example of FIG. 2, an actual user time between keystrokes ranges from between 0.13 to 0.30 seconds as shown at 202, while the synthetic output 206 modified using a randomly generated change vector 204 ranges from between 0.08 to 0.41 seconds. In some examples, constraints such as minimum or maximum times may be imposed on the change vector, such that a realistic synthetic output is produced at 206. In alternate examples, the change vector takes into account a likely distribution of user characteristics and chooses change vector coefficients randomly but in view of this probabilistic distribution of user biometrics, ensuring that detectably unusual biometric characteristics are not produced or are rarely produced by the generated change vector.

The change vector shown at 204 effectively changes a user's keyed text entry actual biometric signature into a new and different keyed entry synthetic biometric signature (marked as changed output 206), such that the synthetic output 206 rather than the user's actual keyed input 202 is presented to an app, web page, or other service visible to a third-party. A different change vector can be employed for each of a plurality of third-party apps, web pages, or other providers, greatly reducing the ability of third parties to track the user across different web pages, apps, or other services using biometric signatures. If a user believes their synthetic biometric signature has been compromised, or desires to reset their user relationship with a third-party the change vector 204 can be reset and a new change vector generated, creating a different biometric signature for interactions with the selected third-party. Although the example of FIG. 2 shows modification of a user's actual biological input using a change vector or artificial biological signature, other examples will comprise an entirely artificial biometric signature, or a biometric signature that relies upon a change vector or artificial biometric signature along with other information such as a user password. In some examples, the change vector or artificial biometric signature is applied to the user's actual biometrics to create the synthetic biometric signature provided to a third-party by merging the artificial biometric signature with the user's actual biometric signature by a selected degree or percentage, such as 20%, 30%, 50%, 70% or the like artificial with the remainder based on the user's actual measured biometrics.

The keyed text entry example of FIG. 2 shows how a change vector can be applied to one type of behavioral biometric signature, and similar methods can be employed for other behavioral or physical biometric signatures in other examples. These include in various examples mouse movement, device movement (such as measured by accelerometers), voice recognition, handwriting recognition, iris imaging or retina imaging, fingerprints, and other such biometrics. In one such example, a user's fingerprint is modified using a change vector altering the pattern, length, and endpoints of various lines or swirls that comprise the fingerprint, while in an alternate embodiment entirely synthetic fingerprints are generated for each of a plurality of different third parties. Similarly, facial recognition synthetic biometric signatures are comprised of completely artificial face profiles in one embodiment, while other embodiments will use change vectors applied to the user's face such as alteration of bone structure and face shape, nose size, eye size and distance, and other such characteristics, or merge the user's biological face with an artificial face, to generate a synthetic face that does not directly resemble the user's actual face. In a more detailed example, artificial face profiles may be applied or "merged" with a user's actual face with varying weights, from a low percentage (i.e., modest changes to a user's actual biometric characteristics) up to 100% (i.e., a biometric signature synthesized from entirely artificial biometric characteristics).

In a more complex example, artificial faces are derived using a method such as an adversarial network such that a different artificial face is created or selected for each different third-party, and the user's face is merged with the artificial face to create the synthetic user face (sometimes known as a "deep fake") that is provided to the third-party. Methods such as this provide for not only still images of faces but can be used with a user's actual live or moving camera image to merge with the artificial face to provide a moving image accepted by third parties that use live motion as a part of biometric authentication.

The change vector or distortion vector such as is shown at 204 of FIG. 2 is in one example stored on the user's device in association with the associated third-party 124 using storage 120 that is local to the user's device 102. In a further example, the change vector is stored incomplete or encrypted, such that user input (such as a password, or a missing part of the change vector) is needed to make use of the change vector.

In preferred embodiments, the change vector is stored rather than a complete synthetic biometric signature such that the user's authentic biometric input is needed along with the stored change vector to generate the biometric signature output 206 associated with each third-party, providing greater security for the user.

In a further preferred embodiment, artificial face profiles may be applied or "merged" with a user's actual biological face with varying weights, from a low percentage (i.e., modest changes to a user's actual biological characteristics) up to 100% (i.e., a biometric signature synthesized from entirely artificial biometric characteristics). In some examples, one or more functions of the user's device, such as generating the change vector, storing the change vector, and/or modifying the change vector with the user's actual biometric signature, or actual biometric data, are performed on another device, such as a remote server 124 that hosts a synthetic biometric signature service for users and communicates securely with various user clients.

Figure 3:
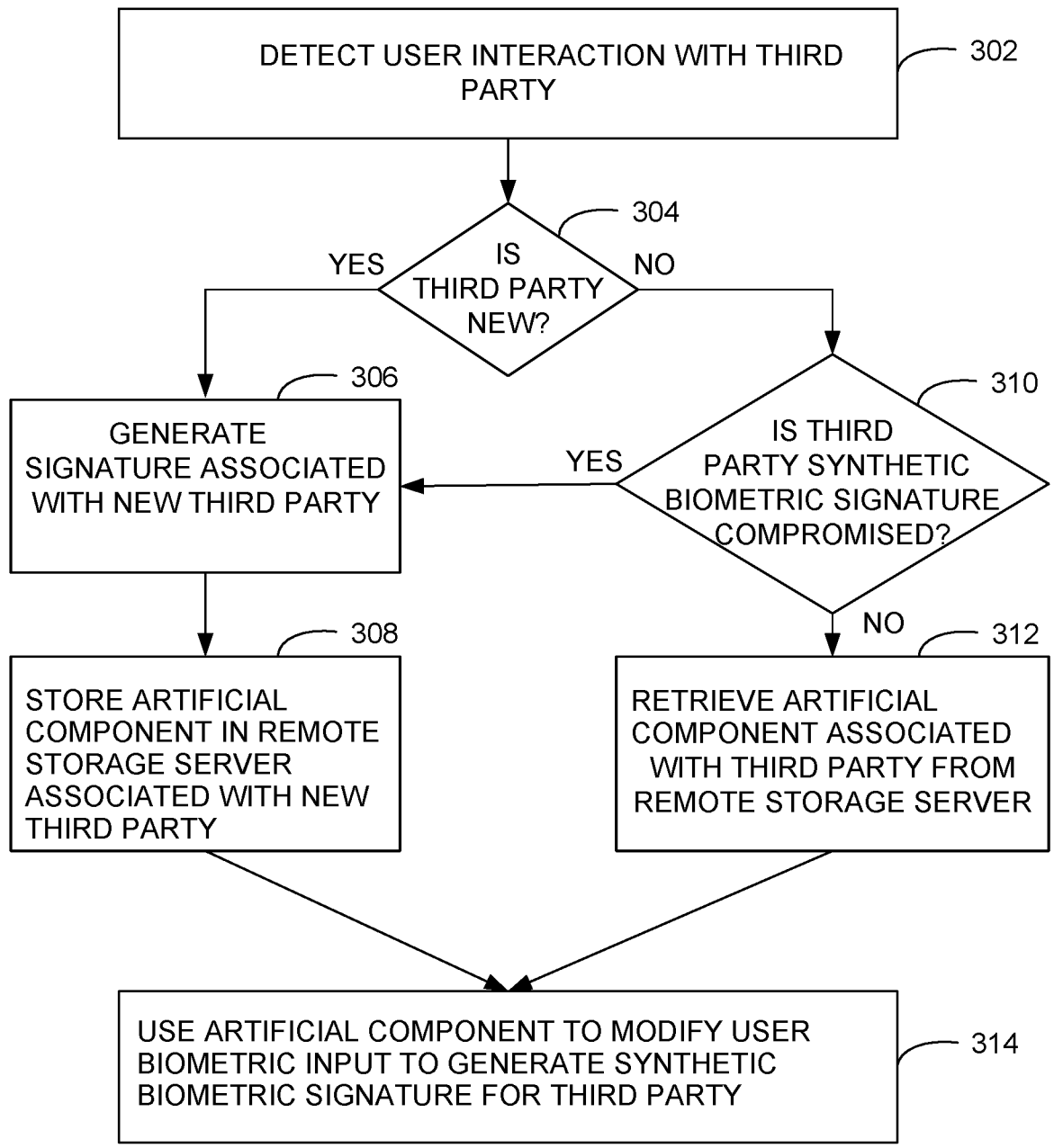
FIG. 3 is a flowchart of a method of using synthetic biometric signatures, consistent with an example embodiment.

FIG. 3 is a flowchart of a method of using synthetic biometric signatures, consistent with an example embodiment. Here, a software service executing on a user's computerized device, such as a browser plugin or other such service, detects a user interaction with a third-party at 302. In various examples, the third-party user interaction comprises interacting with an app, entering text in a web browser, performing a biometric authentication to a third-party, or other such action. At 304, the software service determines whether the third-party is a new third-party, or whether the service has a record of the user previously interacting with the third-party.

If the user is determined to be interacting with a new third-party at 304, a change vector, artificial biometric signature, and/or artificial biometric characteristics are created at 306 and are associated with the new third-party. The change vector or artificial biometric signature are used to alter the user's actual biometric signature. The change vector, artificial biometric signature, and/or artificial biometric characteristics and the associated third-party are then stored at 308, so that the change vector, artificial biometric signature, and/or artificial biometric characteristics can be used to generate a synthetic biometric signature to allow authorization with the third-party in future interactions.

If the third-party is determined to not be new at 304, a determination is made as to whether a synthetic biometric signature associated with that third-party is compromised at 310. In a further example the process also allows the user to elect to change the synthetic biometric signature used to interact with the third-party at this or another point in the process. If the third-party synthetic biometric signature is not compromised and the user does not wish to change it, the change vector, artificial biometric signature, or artificial biometric characteristics associated with the third-party is retrieved at 312, such as from a remote storage server. If the third-party synthetic biometric signature is compromised or a change is desired at 310, new change vector, artificial biometric signature, and/or artificial biometric characteristics are created at 306 and stored at 308.

At 314, the change vector, artificial biometric signature, and/or artificial biometric characteristics associated with the third-party is used to interact with the third-party by modifying a user's actual biometric input by applying the change vector, artificial biometric signature, and/or artificial biometric characteristics to a user's actual biometric input or by merging the user's actual biometric input with an artificial biometric signature to generate a synthetic biometric signature, or a synthetic biological characteristics (synthetic biometric signal) that is presented to the third-party. In various embodiments, this comprises modifying a physical feature such as a fingerprint, iris, retina, or face scan, changing another physical attribute of the user, or merging artificial biometric characteristics with a user's actual biometric characteristics. In other embodiments, this comprises changing a user action or behavior, such as the cadence with which a user types, how they use a mouse, how they handle or move a device such as a smartphone, or how they walk, gesture, or perform other such movements by either applying a change vector to a user's actual biometric characteristics or by merging a user's actual biometrics with artificial biometrics to create a synthetic biometric signature. Using a different synthetic biometric signature for different third parties prevents the user from being tracked across different third-party sites or services, and allows the user to reset their user relationship with a third-party by resetting their synthetic biometric signature associated with the third-party, such as if their synthetic biometric signature is compromised.

The examples presented herein show how a computerized device such as a smart phone can be used to create, manage, and store synthetic biometric signatures, and to perform the methods described above. In some example embodiments, the systems, methods, and techniques described herein are performed on one or more computerized systems having various specific components such as a camera to perform these functions. Such computerized systems are able in various examples to perform the example methods and other such tasks by executing software instructions on a processor, and through use of associated hardware.

Figure 4:
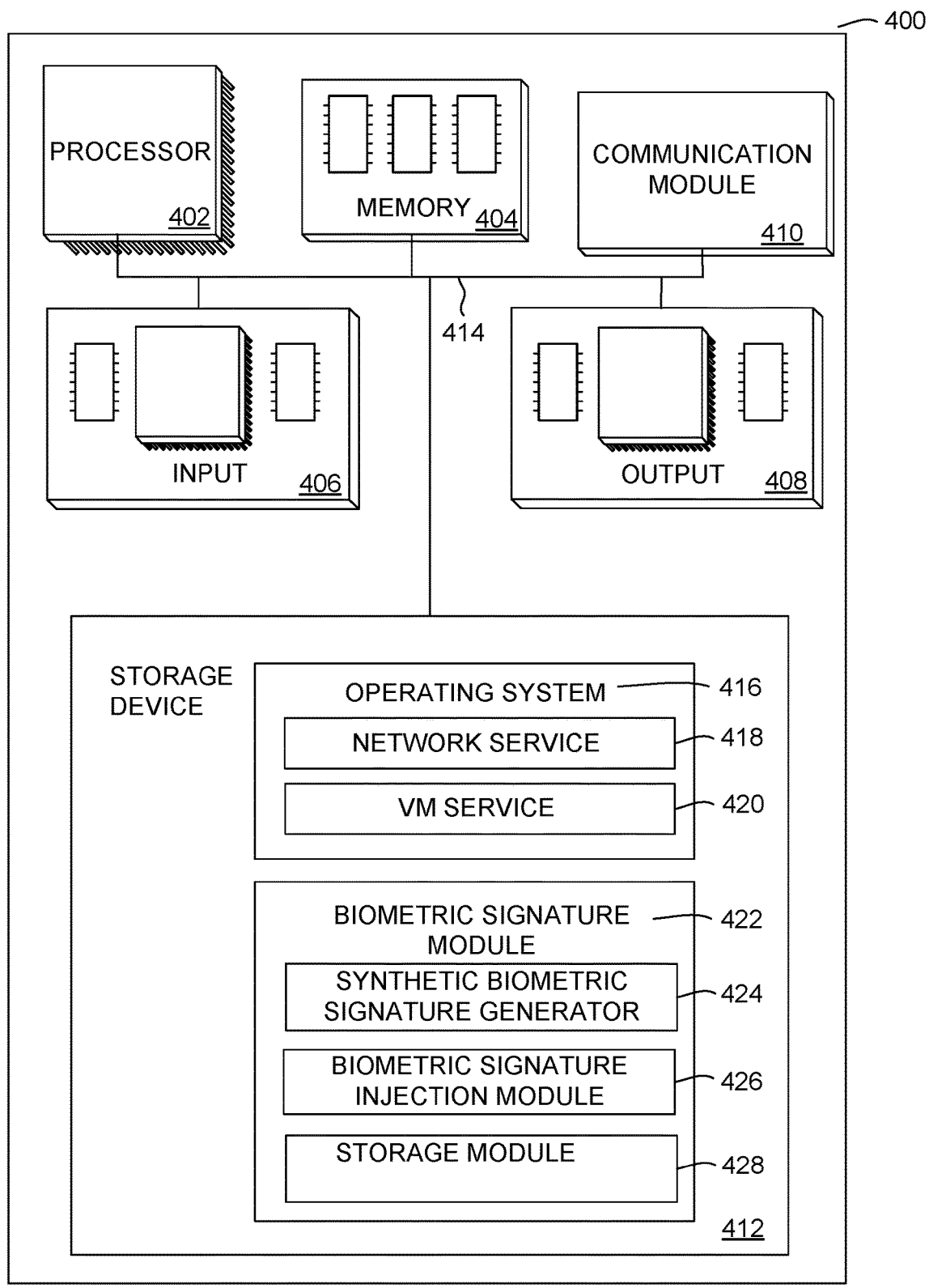
FIG. 4 is a computerized system employing synthetic biometric signatures, consistent with an example embodiment.

FIG. 4 is one example of such a computerized system employing synthetic biometric signatures. FIG. 4 illustrates only one particular example of computing device 400, and other computing devices 400 may be used in other embodiments. Although computing device 400 is shown as a standalone computing device, computing device 400 may be any component or system that includes one or more processors or another suitable computing environment for executing software instructions in other examples and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server or virtualized honeypot device. One or more applications, such biometric signature module 422, are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as password manager 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random-access memories (DRAM), static random-access memories (SRAM), and other forms of volatile memories known in the art. In some examples, storage device 412 is used to store program instructions for execution by processors 402. Storage device 412 and memory 404, in various examples, are used by software or applications running on computing device 400 such as biometric signature module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to wirelessly communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as biometric signature module 422 to components of computing device 400. For example, operating system 416, in one example, facilitates the communication of various applications such as biometric signature module 422 with processors 402, communication unit 410, storage device 412, input device 406, and output device 408. Applications such as biometric signature module 422 may include program instructions and/or data that are executable by computing device 400. As one example, biometric signature module 422 uses synthetic biometric signature generator 424 to generate synthetic biometric signatures associated with various third parties for a user, and injects the synthetic biometric signature in place of the user's actual biometric signature or injects synthetic biological characteristics (a synthetic biometric signal) in place of a user's actual biological characteristics as captured by input device when interacting with the third parties via biometric signature injection module 426. In one such example, the biometric signature injection module 426 merges an artificially created biometric signature such as a face image or fingerprint with the user's actual biometric signature, resulting in a synthetic biometric signature when interacting with the third parties. The change vector, change vector, artificial biometric signature, and/or artificial biometric characteristics are stored along with their respective third-party associations in storage module 428, such that they can be retrieved for future interaction with the third parties. These and other program instructions or modules may include instructions that cause computing device 400 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of using synthetic biometric signatures to identify a user, comprising:
 identifying a plurality of third parties for whom identity protection is desired;
 generating a synthetic biometric signature for the user for each of the plurality of third parties, wherein the user has an actual biometric signature, wherein, for each one of the plurality of third parties, a change vector is applied to the user's actual biometric signature to generate the synthetic biometric signature corresponding to the one of the plurality of third parties; and
 interacting with an associated third-party; wherein the associated third-party is one of the plurality of third parties, using the synthetic biometric signature for the user corresponding to the respective one of the plurality of third parties,
 wherein the change vector is stored along with its respective third-party association such that it may be retrieved for future interaction with the respective third party, and wherein the synthetic biometric signature comprises a change or distortion of the user's actual biometric signature and cannot be identified by any of the plurality of third parties as synthetic or changed from a user's actual biometric input,
 wherein the synthetic biometric signature is generated by merging the user's actual biometric signature with an artificial component or by applying a probabilistically selected change vector that alters the biometric signature within bounds of typical human variability,
 wherein the synthetic biometric signature is configured such that biometric analysis algorithms used by third parties cannot detect the applied change or identify the synthetic biometric as altered or non-authentic, and
 wherein the inability of the third parties to identify the biometric signature as synthetic is due at least in part to the probabilistic shaping of the change vector or artificial component based on expected biometric distributions.

2. The method of using synthetic biometric signatures to identify a user of claim 1, further comprising storing at least the change vector, an artificial biometric signature, artificial biometric characteristics, or combinations thereof, for each of the plurality of third parties such that it can be loaded and used for subsequent user interaction with the respective third-party.

3. The method of using synthetic biometric signatures to identify a user of claim 2, wherein saved change vectors, artificial biometric signatures, artificial biometric characteristics, or combinations thereof are synchronized across a plurality of user devices.

4. The method of using synthetic biometric signatures to identify a user of claim 3, further comprising saving a data item associated with the synthetic biometric signature, wherein the saved data item is used to generate the synthetic biometric signature.

5. The method of using synthetic biometric signatures to identify a user of claim 4, wherein the data item comprises a number, a hash, or combinations thereof.

6. The method of using synthetic biometric signatures to identify a user of claim 2, wherein the synthetic biometric signature comprises an artificial component and the user's actual biometric signature that is merged to create the synthetic biometric signature.

7. The method of using synthetic biometric signatures to identify a user of claim 4, wherein saved data items are synchronized across a plurality of user devices.

8. The method of using synthetic biometric signatures to identify a user of claim 1, further comprising changing the synthetic biometric signature corresponding to one of the plurality of third parties if the synthetic biometric signature for that third-party is compromised.

9. The method of using synthetic biometric signatures to identify a user of claim 1, further comprising changing the synthetic biometric signature corresponding to one of the plurality of third parties based on user input, enabling the user to reset an identity relationship with the third-party.

10. The method of using synthetic biometric signatures to identify a user of claim 1, wherein the synthetic biometric signature comprises at least one of the user's: mouse handling characteristics, keyboard key press characteristics, and device handling characteristics.

11. The method of using synthetic biometric signatures to identify a user of claim 1, wherein the synthetic biometric signature comprises at least one of the user's: fingerprint, iris, face topology, image, infrared image, handwriting, and voice.

12. The method of using synthetic biometric signatures to identify a user of claim 1, wherein the synthetic biometric signature comprises a biometric signature not derived from the user's actual biometric signature.

13. The method of using synthetic biometric signatures to identify a user of claim 1, further comprising executing a process on a computerized device to modify inputs to the computerized device to reflect the synthetic biometric signature.

14. The method of using synthetic biometric signatures to identify a user of claim 1, wherein the synthetic biometric signature comprises synthetic biological characteristics.

15. A computerized biometric identification management system, comprising: a processor and a memory; a biometric identification software module executable on the processor, the biometric identification software module operable when executed to:
identify a plurality of third parties for whom identity protection is desired;
generate a synthetic biometric signature for a user for each of the plurality of third parties, wherein the user has an actual biometric signature, wherein a change vector is applied to the user's actual biometric signature to generate the synthetic biometric signature; and
interact with an associated third-party using the synthetic biometric signature for the user for each of the respective plurality of third parties,
wherein the change vector is stored along with its respective third-party association such that it may be retrieved for future interaction with the respective third party, and wherein the synthetic biometric signature comprises a change, distortion, or alteration of the user's actual biometric signature and cannot be identified by any of the plurality of third parties as changed from a user's actual biometric input,
wherein the synthetic biometric signature is generated by merging the user's actual biometric signature with an artificial component or by applying a probabilistically selected change vector that alters the biometric signature,
wherein the synthetic biometric signature is configured such that biometric analysis algorithms used by third parties cannot detect the applied change or identify the synthetic biometric as altered or non-authentic, and
wherein the inability of the third parties to identify the biometric signature as synthetic is due at least in part to the probabilistic shaping of the change vector or artificial component based on expected biometric distributions.

16. The computerized biometric identification management system of claim 15, further comprising saving at least an artificial portion for each of the plurality of third parties such that it can be loaded and used for subsequent user interaction with the respective third-party.

17. The computerized biometric identification management system of claim 16, wherein saved artificial portions are synchronized across a plurality of user devices.

18. The computerized biometric identification management system of claim 16, wherein the biometric identification software module is further operable to save a data item associated with the synthetic biometric signature, wherein the saved data item is used to generate the synthetic biometric signature.

19. The computerized biometric identification management system of claim 18, wherein the data item comprises a number, a letter, a character, a hash, or combinations thereof.

20. The computerized biometric identification management system of claim 18, wherein saved data items are synchronized across a plurality of user devices.

21. The computerized biometric identification management system of claim 16, wherein the biometric identification software module is further operable to change the synthetic biometric signature corresponding to one of the plurality of third parties if the synthetic biometric signature corresponding to that third-party is compromised or based on user input, enabling the user to reset an identity relationship with that third-party.

22. The computerized biometric identification management system of claim 15, wherein the synthetic biometric signature comprises at least one of the user's: mouse handling characteristics, keyboard key press characteristics, and device handling characteristics.

23. The computerized biometric identification management system of claim 15, wherein the synthetic biometric signature comprises at least one of the user's: fingerprint, iris, face topology, image, infrared image, handwriting, and voice.

24. The computerized biometric identification management system of claim 15, wherein the biometric identification software module is further operable to modify inputs to a device to reflect the synthetic biometric signature.

25. The computerized biometric identification management system of claim 15, wherein the biometric identification software module is further operable to use user input as part of the synthetic biometric signature.

26. The computerized biometric identification management system of claim 25, wherein the user input comprises: a password, letters, numbers, characters, or combinations thereof.

27. The computerized biometric identification management system of claim 26, wherein the synthetic biometric signature comprises synthetic biological characteristics.

* * * * *